(12) United States Patent
Vasudev et al.

(10) Patent No.: US 10,929,386 B2
(45) Date of Patent: Feb. 23, 2021

(54) MULTI-RECORD TRANSACTIONS IN DATA-CENTRIC SYSTEMS

(71) Applicant: salesforce.com, Inc., San Francisco, CA (US)

(72) Inventors: Gautam Vasudev, San Francisco, CA (US); Matthew Davidchuk, San Francisco, CA (US); Adarsha Badarinath, Foster City, CA (US); Kristen Muramoto, San Francisco, CA (US); Orjan N. Kjellberg, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 405 days.

(21) Appl. No.: 15/860,108

(22) Filed: Jan. 2, 2018

(65) Prior Publication Data
US 2019/0205442 A1    Jul. 4, 2019

(51) Int. Cl.
*G06F 16/23* (2019.01)
*G06Q 30/00* (2012.01)

(52) U.S. Cl.
CPC ......... *G06F 16/2379* (2019.01); *G06Q 30/01* (2013.01)

(58) Field of Classification Search
CPC ................................................ G06F 16/2379
USPC ........................................................ 707/736
See application file for complete search history.

(56) References Cited

U.S. PATENT DOCUMENTS

| | | | | |
|---|---|---|---|---|
| 7,076,727 B1* | 7/2006 | Flam | ................... | G06F 16/2291 |
| | | | | 715/202 |
| 7,231,267 B2* | 6/2007 | Bournas | ..................... | G06F 8/20 |
| | | | | 700/91 |
| 7,822,706 B1* | 10/2010 | Baltazar | ................. | G06Q 10/10 |
| | | | | 707/608 |
| 8,271,439 B2* | 9/2012 | Peters | ................. | G06F 16/2379 |
| | | | | 707/624 |
| 8,972,849 B2* | 3/2015 | Marum | ............... | G06F 16/2379 |
| | | | | 715/229 |
| 9,886,532 B1* | 2/2018 | Scallon | ................... | G06F 30/20 |
| 10,437,815 B2* | 10/2019 | Suri | .................... | G06F 16/2365 |
| 10,735,280 B1* | 8/2020 | Finch | ..................... | H04L 67/20 |
| 2003/0174704 A1* | 9/2003 | Ambe | .................... | H04L 69/22 |
| | | | | 370/392 |
| 2003/0177257 A1* | 9/2003 | Relan | .................. | H04L 63/0428 |
| | | | | 709/236 |
| 2005/0222971 A1* | 10/2005 | Cary | .................... | G06Q 10/109 |
| 2006/0022048 A1* | 2/2006 | Johnson | .................. | H04L 67/18 |
| | | | | 235/462.1 |
| 2006/0200774 A1* | 9/2006 | Flam | ....................... | G06F 16/28 |
| | | | | 715/764 |
| 2008/0046676 A1* | 2/2008 | Peters | ................. | G06F 16/2379 |
| | | | | 711/200 |

(Continued)

*Primary Examiner* — Hanh B Thai
(74) *Attorney, Agent, or Firm* — Butzel Long (57) ABSTRACT

Methods of digital data processing support performing user-defined actions on multiple data records in order to update those records and/or to create new records and/or post communication to email or social network platforms. Such methods can include receiving definitions of records and of actions to perform with respect to them. Those methods can further include determining default values for data fields of records to create or update during performance of a selected such action with respect to the multiple selected data records, and populating those records and/or communications with those values.

27 Claims, 6 Drawing Sheets

(56) References Cited

U.S. PATENT DOCUMENTS

| | | | | |
|---|---|---|---|---|
| 2008/0313005 | A1* | 12/2008 | Nessland | G06Q 10/06315 |
| | | | | 705/7.21 |
| 2009/0210418 | A1* | 8/2009 | Arasu | G06F 16/258 |
| 2011/0282907 | A1* | 11/2011 | Ramsey | G06F 21/6218 |
| | | | | 707/783 |
| 2012/0151486 | A1* | 6/2012 | Owen | G06Q 10/0631 |
| | | | | 718/100 |
| 2012/0167095 | A1* | 6/2012 | Owen | G06Q 10/0631 |
| | | | | 718/100 |
| 2013/0103640 | A1* | 4/2013 | Rehman | G06F 16/256 |
| | | | | 707/609 |
| 2013/0232192 | A1* | 9/2013 | Kawagata | G06Q 10/06 |
| | | | | 709/203 |
| 2014/0280134 | A1* | 9/2014 | Horen | G06Q 50/01 |
| | | | | 707/736 |
| 2014/0280329 | A1* | 9/2014 | Beechuk | H04L 67/10 |
| | | | | 707/770 |
| 2016/0378756 | A1* | 12/2016 | Kemp | G06F 16/24565 |
| | | | | 707/722 |

\* cited by examiner

MULTI-RECORD TRANSACTIONS IN DATA-CENTRIC SYSTEMS

BACKGROUND

Field of Technology

This relates to digital data processing and, more particularly, transactions involving multiple records in data-centric systems including, for example, database management systems. It has application, by way of non-limiting example, in facilitating user operations on customer and other data records in CRM applications, among others.

Among the basic operations of data-centric digital data processing systems are record creation and updating. Early database management systems and applications upon which they were built made those operations available to end users to populate and maintain rigidly defined data tables and their constituent data records. Advances in the art lessened that rigidity, making it possible for authorized users to not only create and update records but, also, to define data tables and records themselves.

While those advances have resulted in proliferation and use of data-centric applications, they do not afford end users sufficient flexibility to take advantage of the possibilities of these technologies.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Figure 1:
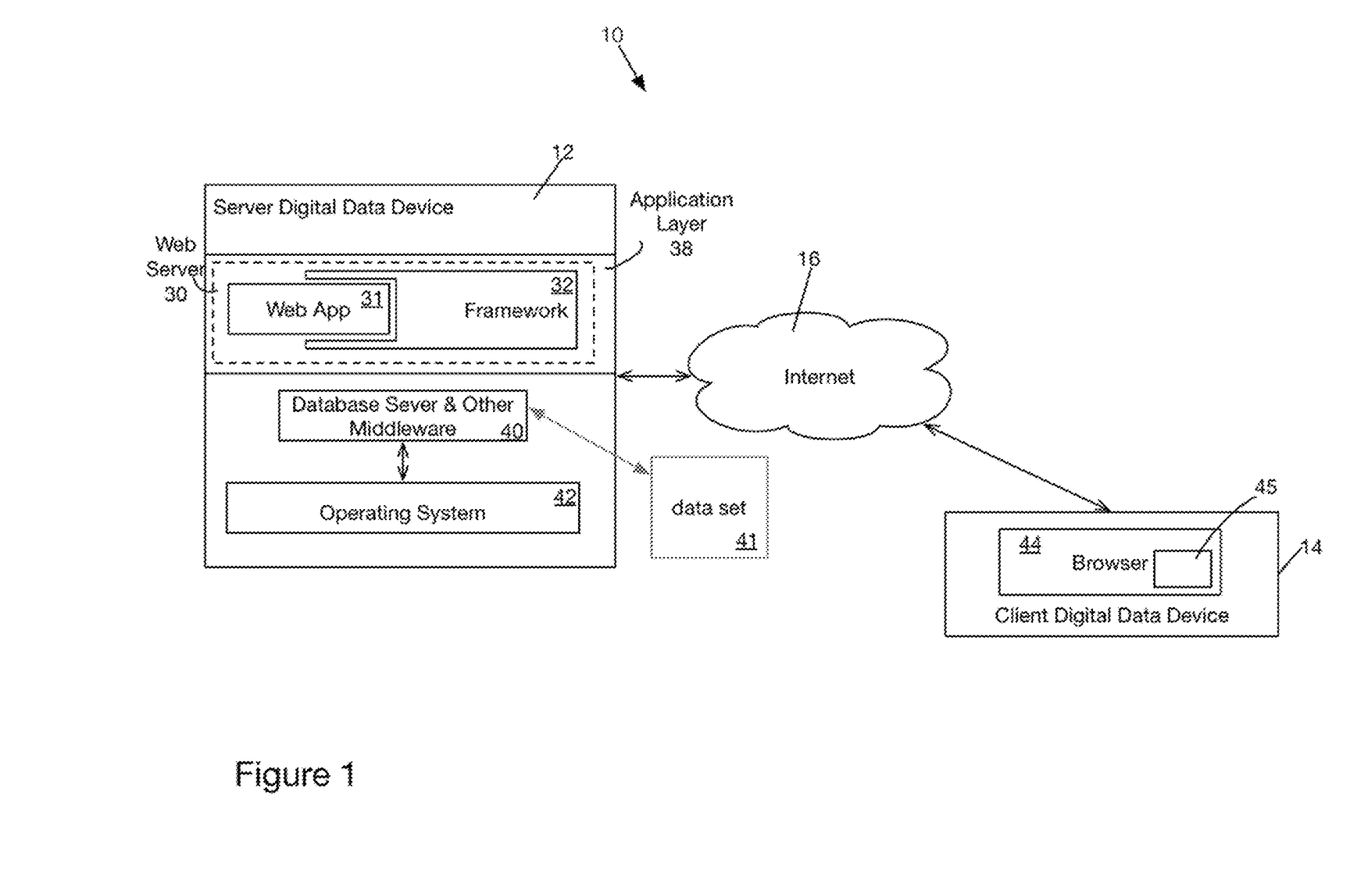
FIG. 1 depicts an illustrative embodiment and an environment in which it is employed.

FIG. 1 depicts a digital data processing system 10 that includes a server digital data device ("server") 12 coupled to a client digital data device ("client") 14 via a network 16. Devices 12, 14 comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsections (not shown here) of the type known in the art and suitable for (i) executing software of the type known in the art (e.g., applications software, operating systems, and/or middleware, as applicable) as adapted in accord with the teachings hereof and (ii) communicating over network 16 to one or more of the other devices 12, 14 in the conventional manner known in the art as adapted in accord with the teachings hereof.

Examples of such software include web server 30 that executes on device 12 and that responds to requests in HTTP or other protocols for transferring web pages, downloads and other digital content to a requesting device, e.g., client 14, over network 16, in the conventional manner known in the art as adapted in accord with the teachings hereof. The web server 30 can also respond to requests in such protocols for effecting user-requested operations, such as, defining records, defining actions, selecting information displayed by a graphical user interface, and so forth, all by way of non-limiting example, and all in the conventional manner known in the art as adapted in accord with the teachings hereof.

In the illustrated embodiment, web server 30 comprises web application 31 executing on device 12 within and/or in connection with a web application framework 32. Web application 31 comprises conventional such software known in the art as adapted in accord with the teachings hereof for effecting specific behavior by the server 12 in response to requests from the client 14 at the behest of users thereof. Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications, one of which is shown here (to wit, web application 31).

In the illustrated embodiment, web server 30 and its constituent components, web application 31 and web application framework 32, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web application 31 and/or framework 32 in order to process at least some of the requests received by server 30 from client 14. Those other layers include, for example, a data layer (which provides services supporting interaction with a database server 40 or other middleware in the conventional manner known in the art as adapted in accord with the teachings hereof) and the server's operating system 42 (which manages the server hardware and software resources and provides common services for software executing thereon in the conventional manner known in the art as adapted in accord with the teachings hereof). Other embodiments may utilize an architecture with a greater or lesser number of layers and/or with layers providing different respective functionalities than those illustrated here.

Though described herein in the context of a web server 30, in other embodiments applications 31 and 32 may define other functionality suitable for responding to user requests, e.g., a video server, a music server, or otherwise. And, though shown and discussed here as comprising web application 31 and web framework 32, in other embodiments, the web server 30 may combine the functionality of illustrated components 31 and 32 in a single component or distribute it among still more components.

With continued reference to FIG. 1, client device 14 of the illustrated embodiment executes a web browser 44 that (typically) operates under user control to generate requests in HTTP or other protocols, e.g., to download pages, to define records, to define actions, to make user selections, and so forth, and to transmit those requests to web server 30 over network 14—all in the conventional manner known in the art as adapted in accord with the teachings hereof. Though referred to here as a web browser, in other embodiments application 44 may comprise other functionality suitable for transmitting requests to a server 30 and/or presenting content received therefrom in response to those requests, e.g., a video player application, a music player application or otherwise.

The devices 12, 14 of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although one client device 14 is shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, one or more of devices 12, 14 may be configured as and/or to provide a database system (including, for example, a multi-tenant database system) or other system or environment; and, although shown here in a client-server architecture, the devices 12, 14 may be arranged to interrelate in a peer-to-peer, client-server or other protocol consistent with the teachings hereof.

Network 14 comprises one or more networks suitable for supporting communications between server 12 and client device 14. The network comprises one or more arrangements of the type known in the art, e.g., local area networks (LANs), wide area networks (WANs), metropolitan area networks (MANs), and or Internet(s). Although a client-server architecture is shown in the drawing, the teachings hereof are applicable to digital data devices coupled for communications in other network architectures.

As those skilled in the art will appreciate, the "software" referred to herein—including, by way of non-limiting example, web server 30 and its constituent components, web application 31 and web application framework 32, browser 44, proxy 45 (discussed below)—comprise computer programs (i.e., sets of computer instructions) stored on transitory and non-transitory machine-readable media of the type known in the art as adapted in accord with the teachings hereof, which computer programs cause the respective digital data devices, e.g., 12, 14 to perform the respective operations and functions attributed thereto herein. Such machine-readable media can include, by way of non-limiting example, hard drives, solid state drives, and so forth, coupled to the respective digital data devices 12, 14 in the conventional manner known in the art as adapted in accord with the teachings hereof.

Described below is operation of the web application 31, working in cooperation with framework 32 and the other components of servers 12 and 30, as well as with browser 44 and other components of client device 14, all in the conventional manner known in the art as adapted in accord with the teachings hereof. Although many of the steps described below are ascribed to web application 31 (and, by implication, to other components of servers 12 and 30 working therewith in the conventional manner known in the art as adapted in accord with the teachings hereof), it is within the ken of those skilled in the art to execute some or more of those steps on browser 44 (e.g., directly and/or through operation of software 45 executing on client 14 as a server proxy or otherwise) consistent with the teachings hereof.

Beginning at illustrated step 100, server 12 and, more particularly, web server 30 initiates a runtime operational session of a web application 31 that creates, accesses, updates, deletes and/or otherwise manages and/or uses data records (and generates communications, such as email and/or social network postings, in connection therewith) that make up a data set 41 (FIG. 1). See FIG. 2, step 100. This can be in response to a request issued by browser 44 (e.g., for a web page associated with and/or generated by application 31 or otherwise) at the behest of a user thereof or otherwise. The data set 41, which can be stored in a database or other store in the conventional manner shown in the art as adapted in accord with the teachings hereof, is shown here by way of non-limiting example coupled to database server/middleware 40, though, other embodiments may disposed the data set 41 otherwise.

The application 31 is referred to, here, as a "data set management application," or the like, without limitation or loss of generality, regardless of its purpose and/or intended user base. Thus, data set management application 31 can be a general-purpose database management system, a special-purpose tool for a data-centric data analysis application or otherwise, a user-customizable customer relationship manager (CRM) application, or otherwise, all by way of example.

The term "record" is used here in the conventional sense of the computer arts to refer to a data structure comprising a collection of fields (logical or otherwise) which, themselves, may be of varying data types. The term "field" is likewise used here in the conventional sense of the computer arts to refer to a member or element of a record that may hold an individual datum or, itself, a collection of data. Records shown in the drawings of the illustrated embodiment are of the type known as "rows" of a table or flat file. This is by way of example, for sake of simplicity and without loss of generality: in other embodiments, other record structures may be used instead or in addition. The term "data set" is also used herein in the conventional sense of the computer arts to refer to a collection of data—here, a collection that includes data records.

Figure 2:
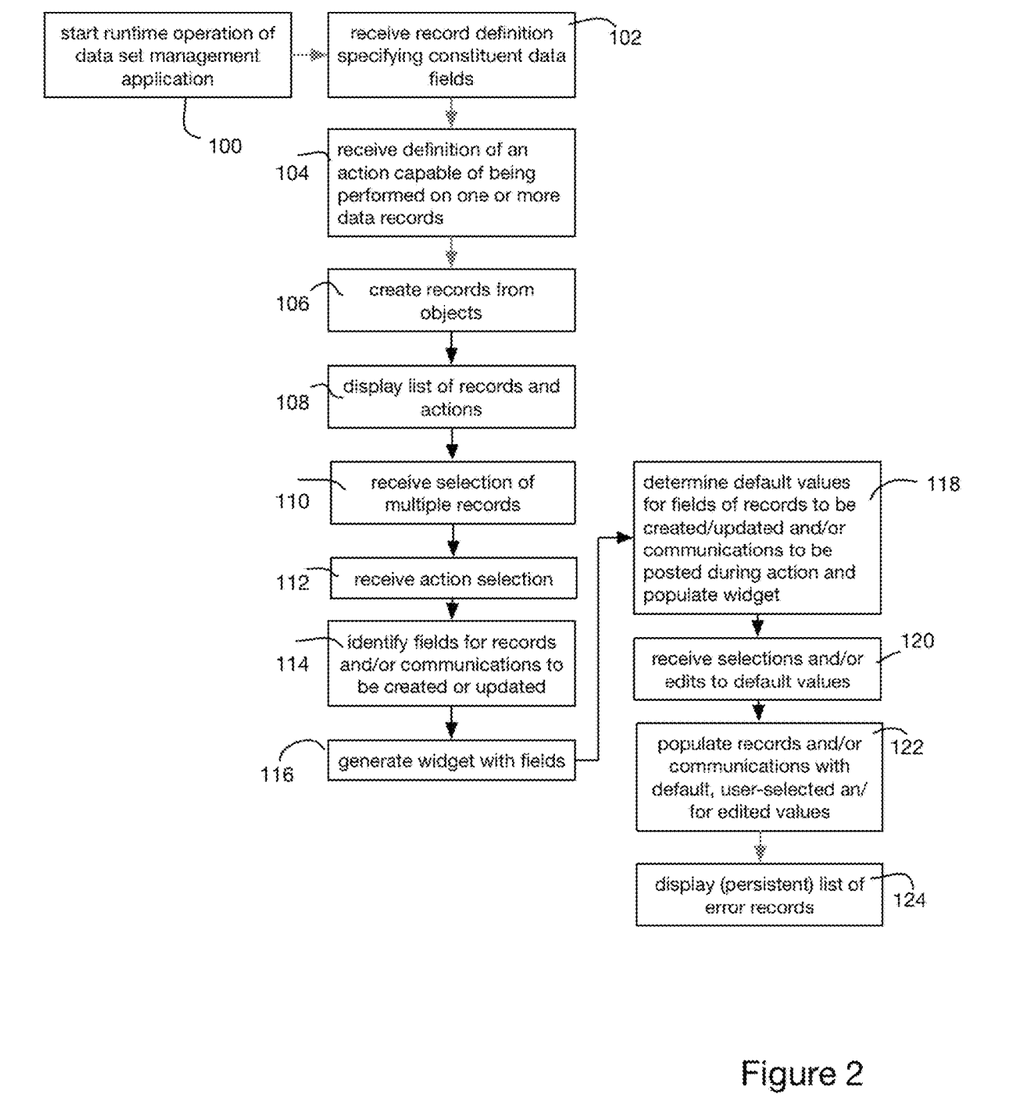
FIG. 2 depicts operation of an embodiment shown in FIG. 1.

In step 102, the data set management application 31 receives definitions of one or more types of records making up a data set 41. The definitions, which can comprise conventional such definitions used in the art (as adapted in accord with the teachings hereof), can be received by application 31 from browser 44 at the behest of the user thereof who enters the definitions by way of a graphical user interface (e.g., generated by application 31 for such purpose), a structured text upload, or otherwise, all in the conventional manner known in the art as adapted in accord with the teachings hereof.

The providing of such definitions can be at the user's initiative (e.g., as signaled by the user's selection of a "define records" option on a graphical user interface generated by the application 31 for display by browser 44), at the prompting of application 31, or otherwise, as per convention in the art as adapted in accord with the teachings hereof. In lieu of performing step 102 in each runtime session, application 31 may include definitions supplied by the user in other (e.g., prior) runtime sessions, that are imported from other applications or sources, that are native to the application 31 (e.g., "canned" or "out of the box" definitions), or otherwise, as per convention in the art as adapted in accord with the teachings hereof.

Figure 3:
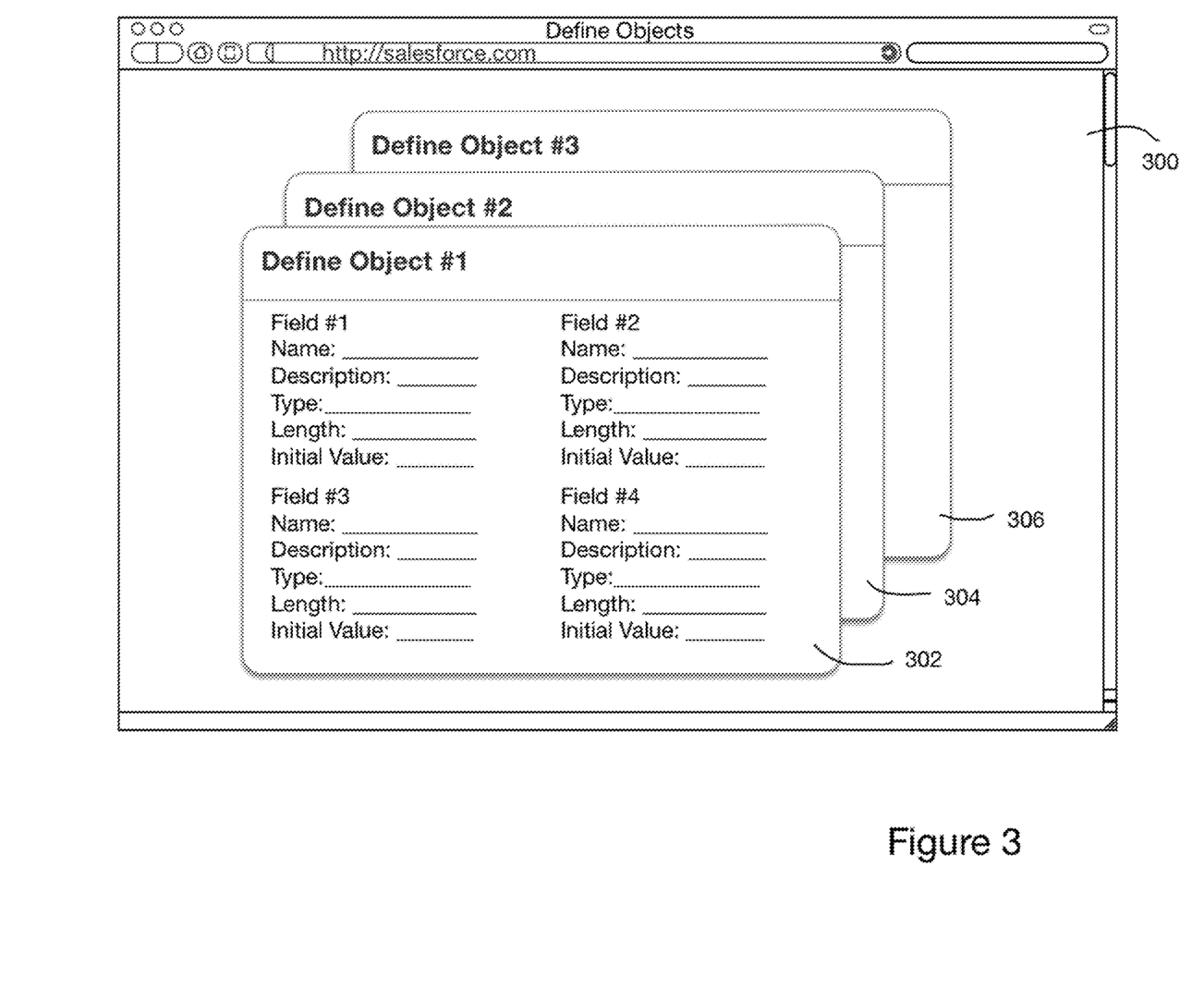
FIG. 3 depicts a widget to facilitate definition of record types in the embodiment shown in FIG. 1.

FIG. 3 depicts a graphical user interface 300 of the type generated by application 31 for display by browser 44 to facilitate user definition of record types, here, by way of user interface widgets 302, 304 and 306, by way of example. In the illustrated embodiment, a record type is referred to as an "object" and a record of that type is referred to as an instantiation of that object, all without loss of generality. Other embodiments may utilize other terminology without deviating from the intent hereof. The term "widget" is used here in the conventional sense of the computer arts to refer to a manipulable graphical user interface element that displays information to and/or accepts information or commands from a user, e.g., of browser 44.

In the illustrated embodiment, a record definition can specify one or more fields that make up the record (e.g., Fields ##1-4 in the case of the record defined in widget 302, by way of example), as well as the type, length and default value of the field, all by way of non-limiting example). Such default values can be specified as fixed values, formulaically, or otherwise, based on pre-existing values of the specified data fields of the specified records, based on metadata relating to those fields or records, or otherwise, as per convention in the art as adapted in accord with the teachings hereof. The generation of user interfaces for receiving and utilizing such definitions in accord with teachings hereof is within the ken of those skilled in the art in view of the teachings hereof.

In step 104, application 31 receives definitions of one or more actions that can be performed on data records that make up the data set 41 that the application creates, accesses, updates, deletes and/or otherwise manages and/or uses. Such actions can include combinations of one or more CRUD tasks (e.g., tasks to create, read, update and delete records) and/or other tasks relating to records in the data set or the information contained in them. Non-limiting examples of such other tasks, include, without limitation, tasks to post communications, e.g., to email and/or social networks.

The action definitions, which can comprise conventional such definitions used in the art (as adapted in accord with the teachings hereof), can be received by application 31 from browser 44 at the behest of the user thereof who enters the definition by way of a graphical user interface (e.g., generated by application 31 for such purpose), a structured text upload, or otherwise, all in the conventional manner known in the art as adapted in accord with the teachings hereof. The providing of such definitions can be at the user's initiative (e.g., as signaled by the user's selection of a "define actions" option on a graphical user interface generated by the application 31 for display by browser 44), at the prompting of application 31, or otherwise, as per convention in the art as adapted in accord with the teachings hereof. In lieu of performing step 104 in each runtime session, application 31 may include action definitions supplied by the user in other (e.g., prior) runtime sessions, that are imported from other applications or sources, and/or that are native to the application 31 (e.g., "canned" or "out of the box" definitions), all per convention in the art as adapted in accord with the teachings hereof.

In the illustrated embodiment, an action definition specifies one or more tasks to be performed (e.g., create record, post email message, etc.), as well as a one or more data records and/or fields in connection with which those one or more tasks are to be executed. Those fields can be data fields of the specified data records and/or fields of the communications to be posted (e.g., emails or social network postings). An action definition can additionally specify default values to be used in connection with each task. Those values can be specified as fixed values, formulaically, or otherwise, based on pre-existing values of the specified data fields of the specified records, based on metadata relating to those fields or records, or otherwise. The generation of user interfaces for receiving and utilizing such definitions in accord with teachings hereof is within the ken of those skilled in the art in view of the teachings hereof.

Figure 4:
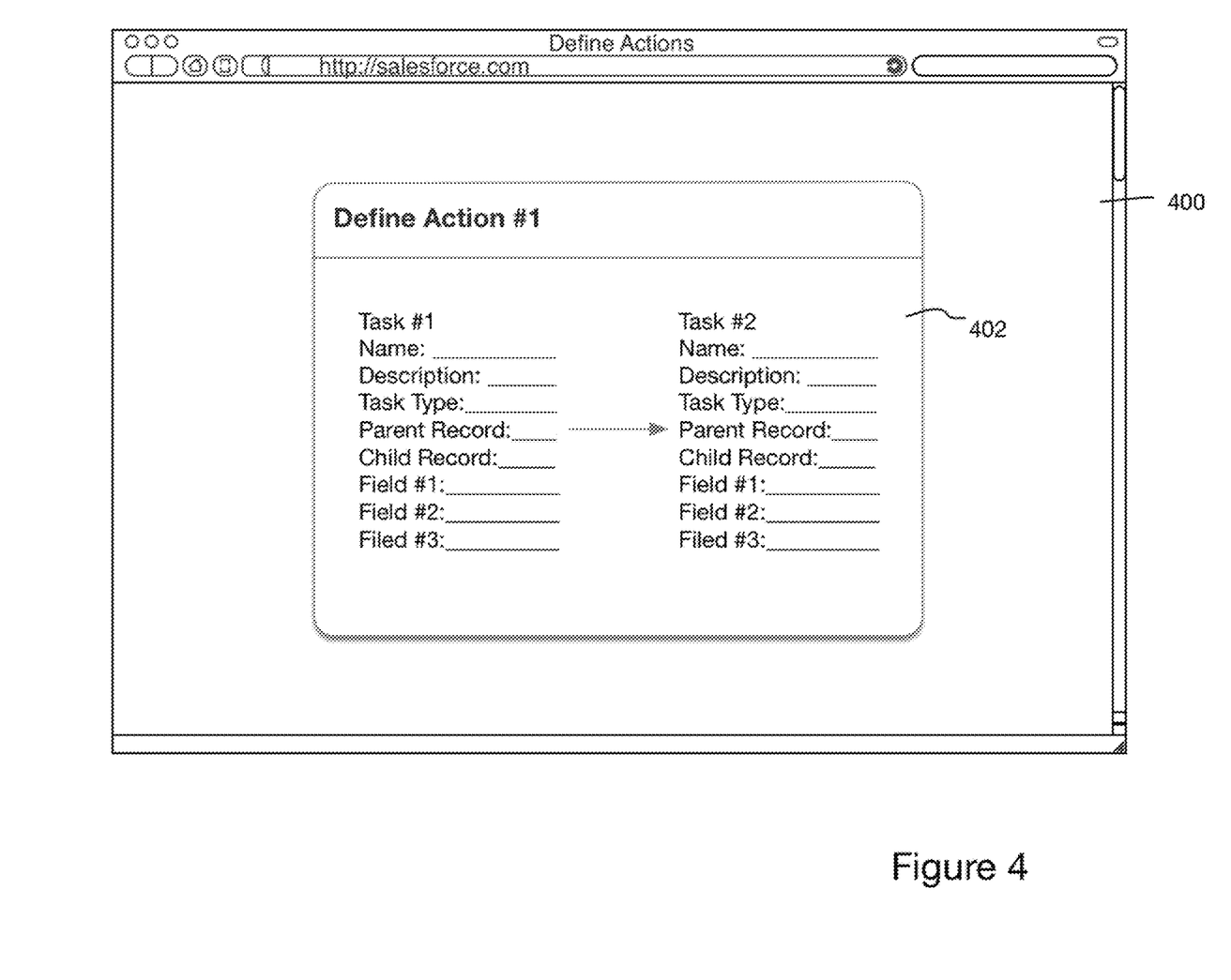
FIG. 4 depicts a widget to facilitate definition of actions in the embodiment shown in FIG. 1.

FIG. 4 depicts a graphical user interface 400 of the type generated by application 31 for display by browser 44 to facilitate user definition of actions, here, by way of user interface widget 402, by way of example. Two such tasks (each defined by name, description, task type, operative records and/or fields, all by way of non-limiting example) are shown in the drawing, along with a graphical indication (i.e., an arrow) that one task (Task #1) is to be followed by the other task (Task #2), also by way of non-limiting example.

In step 106, application 31 creates and stores to data set 41 one or more data records as instantiations of the definitions received in step 102 or otherwise. This can be at the user's initiative (e.g., as signaled by the user's selection of a "create records" option on a graphical user interface generated by the application 31 for display by browser 44), at the prompting of application 31, or otherwise, as per convention in the art as adapted in accord with the teachings hereof. Values for fields of the newly created records can be generated in accord with default (initial) values specified in definitions of the objects (types) from which the records are instantiated. Those values can, instead or in addition, be received by the application 31 from the browser 44 at the behest of the user, who enters the values by way of a graphical user interface (e.g., generated by application 31 for such purpose), by structured text upload, or otherwise, all in the conventional manner known in the art as adapted in accord with the teachings hereof. In lieu of performing step 106 in each runtime session, application 31 may utilize data records supplied by the user in other (e.g., prior) runtime sessions, that are imported from other applications or sources and/or that are provided native to the application 31 (e.g., "canned" or "out of the box" records).

Figure 5:
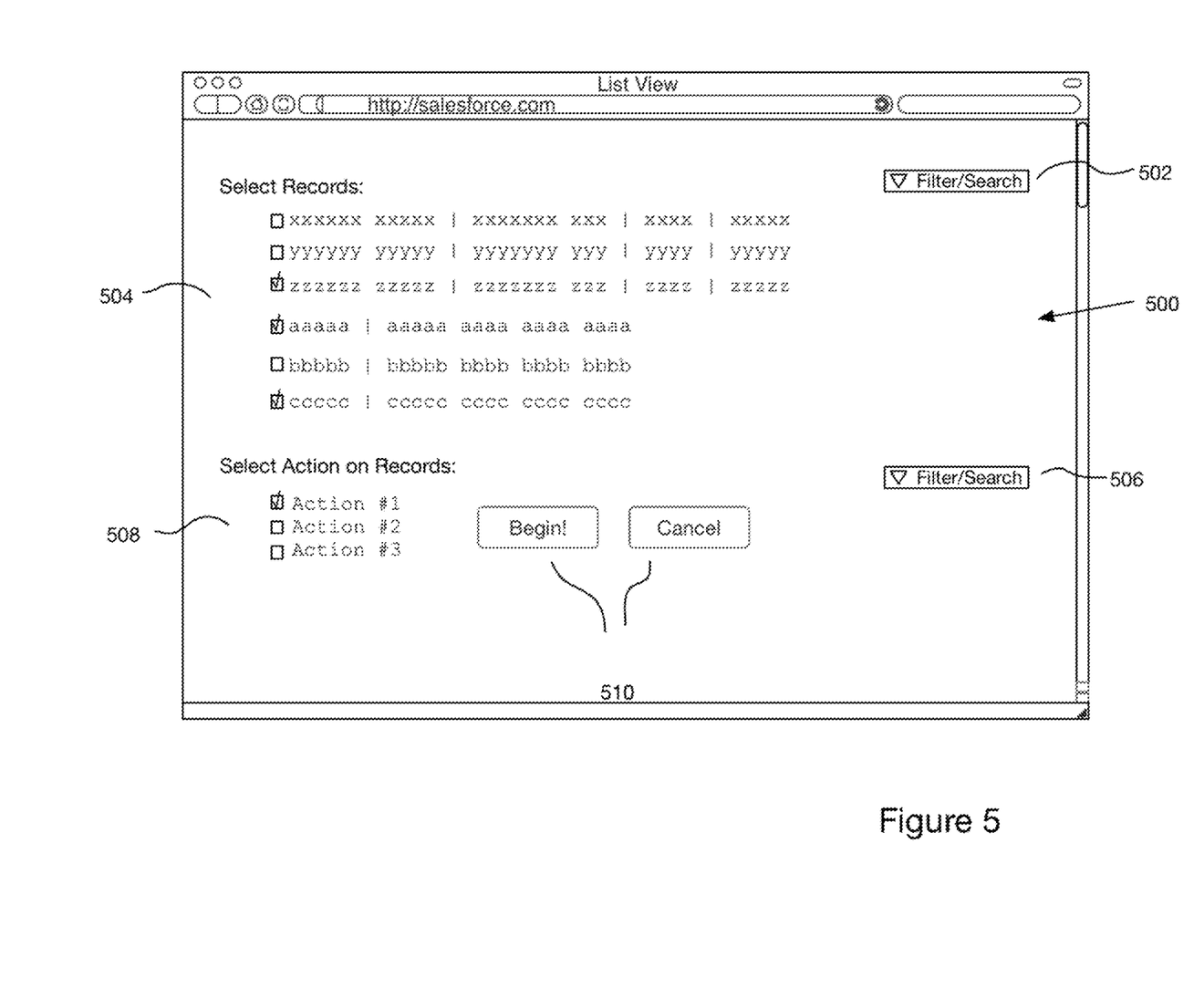
FIG. 5 depicts a widget to list data records and actions in the embodiment shown in FIG. 1.

In step 108, the data set management application 31 generates a list of data records in the data set 41 for display to the user of client device 14, e.g., via a graphical user interface 500 of the type shown in FIG. 5 or otherwise. This can be at the user's initiative (e.g., as signaled by the user's selection of a "list records" option on a graphical user interface generated by the application 31 for display by browser 44), at the prompting of application 31, or otherwise, as per convention in the art as adapted in accord with the teachings hereof. The listing can be complete or partial, based on searching, filtering, sorting or otherwise, as per convention in the art as adapted in accord with the teachings hereof. Each record in the listing, moreover, can be accompanied by a checkbox, radio-button or other widget permitting the user to select the record, e.g., by mouse click or otherwise, and for the application 31 to receive from browser 44 notice of that selection and others, all per step 110, and all as per convention in the art as adapted in accord with the teachings hereof.

In step 108, the data set management application 31 also generates a list of actions, e.g., as defined in connection with step 104. This can be at the user's initiative (e.g., as signaled by the user's selection of a "list records and actions" option on a graphical user interface generated by the application 31 for display by browser 44), by default along with the listing of data records, or otherwise. As above, the listing of actions can be complete or partial, based on searching, filtering, sorting or otherwise. Each listed action, moreover, can be accompanied by a widget permitting the user to select that action and for the application 31 to receive from browser 44 notice of that selection, e.g., as above. See, step 112.

The generation of user interfaces for listing data records and actions and receiving user selections thereof is within the ken of those skilled in the art in view of the teachings hereof.

FIG. 5 depicts a graphical user interface 500 of the type generated by application 31 for display by browser 44 listing data records and actions as discussed above. The listing of records, e.g., filtered per user selection per widget 502, is presented in region 504 of the interface. In the illustration, multiple fields of each record are presented, though, other embodiments may vary in this regard. The listing of actions, e.g., filtered per user selection per widget 506, is presented in region 508 of the interface. Here, only action names are presented, though, again, other embodiments may vary in this regard. Check boxes are generated by application 31 for presentation by browser 44 adjacent each record, permitting user selection of multiple records on which an action is to be performed. Check boxes are likewise generated by application 31 for presentation by browser 44 adjacent each action permitting user selection of an action to perform on the multiple selected records. Using buttons 510, the user can request that the application 31 commence (or cancel) performance of the selected action with respect to the multiple selected data records.

In step 114, the application 31 identifies fields of data records to be created/updated and/or of communications (e.g., emails or social network postings) to be posted during performance of such a "mass" (or batch) action—i.e., during performance of the action for which a selection was received in step 112 with respect to the multiple records for which selections were received in step 110. It makes that identification from from the action definitions received in connection with step 104 for the selected action, as well as from the record definitions received in connection with step 102 for the selected records. Identification of such fields, which can be accomplished by a structured walk-through of the implicated action and record definitions, or otherwise, is within the ken of those skilled in the art in view of the teachings hereof.

In step 116, the application 31 generates a widget with the fields identified in step 114, i.e., the fields to be used to create/update data records and/or post communications during performance of the selected action with respect to the multiple selected records. Typically, the application does not generate a widget for each such record and/or communication but, rather, it generates a widget for field values which will be used to populate all of those records and/or communications (or a subset thereof). Moreover, while in some embodiments the application may generate a single widget for all fields identified in step 114, in other embodiments, it may generate multiple widgets, e.g., one widget for fields common to data records, another for fields common to communications, and so forth, all by way of example.

In step 118, application 31 determines default values for fields in each widget generated in step 116 and populates the respective field of that widget with those values. It can do so for all fields in the widget or for a subset of them, depending on the requirements of a particular embodiment.

Application 31 of the illustrated embodiment employs logic as set forth below to determine values to use in populating the fields in the widget. The application 31 can, as shown in the pseudo-code below, populate each field with an individual value that will be subject to user review and editing in connection with step 120. In other embodiments, it can also populate one or more fields with multiple values that are subject in that step to user review and selection, e.g., via a drop-down list, a radio-button list or so forth, in addition to being subject to user editing. Logic for determining which fields to populate with single values and which to populate with multiple values is also set forth in the logic below.

In some embodiments, the logic for populating widget fields may be expressed as shown by the function getEffectiveValue( ) in the following pseudocode. Other embodiments may vary in one or more of these regards:

Comment:

The function getEffectiveValue( ) returns the value that with which each field in a widget is populated in step 118.

This function loops through each selected record and calculates an effective value for the field in that record, by examining the actual value of the field and optionally the predefined value of the field in the definition of that record. The effective values for all records are compared. If all the effective values are uniformly the same value then that uniform value is returned for use in populating the field in the widget; otherwise null is returned. (In other embodiments, rather than a null value, the widget is populated in such a circumstance with the n most common values determined during the loop-through of records for that field, where n is an integer selected in accord with the requirements of the embodiment).

Parameters:

---

"records" - The "records" parameter is an array of records. Each record in the array is an object that supports the following functions:
  - getFieldValue -> returns the value of the field
  - getFieldPredefinedValue -> returns the default, predefined value that should be used if getFieldValue returns null
"fieldName" - The name of the field.
Call record.getFieldValue(fieldName) to get the value the named field.
============
function getEffectiveValue(records, fieldName)
  var effectiveValue = records[1].getFieldValue(fieldName);
  if effectiveValue is null then
    effectiveValue = records[1].getFieldPredefinedValue(fieldName);
  end if
  var hasMultipleValues = false;
  for i in 2..records.length loop
    if !hasMultipleValues then
      var currentRecordEffectiveValue =
      record[i].getFieldValue(fieldName);
      if currentRecordEffectiveValue is null then
        currentRecordEffectiveValue =
              records[i].getFieldPredefinedValue(fieldName);
      end if
      if currentRecordEffectiveValue != effectiveValue then
        hasMultipleValues = true;
        effectiveValue = null;
      end if
    end if
  end loop
  return effectiveValue;
end function;
============

In step 120, application 31 displays the widget(s) generated in step 118 via browser 44 for user review and editing and, in the case of fields for which a selection among multiple default values is required, to make such selections. The widget also permits the user to enter values in the first instance in the case of fields for no default value has been generated. The application 31 receives the default values from the widget fields, once the user has completed review, selection and editing, e.g., as signaled by the user's striking an "OK" or "Continue" button on the widget, or otherwise, per convention in the art as adapted in accord with the teachings hereof. The display of such a widget for user input and receipt of values therefrom is within the ken of those skilled in the art in view of the teachings hereof.

Figure 6:
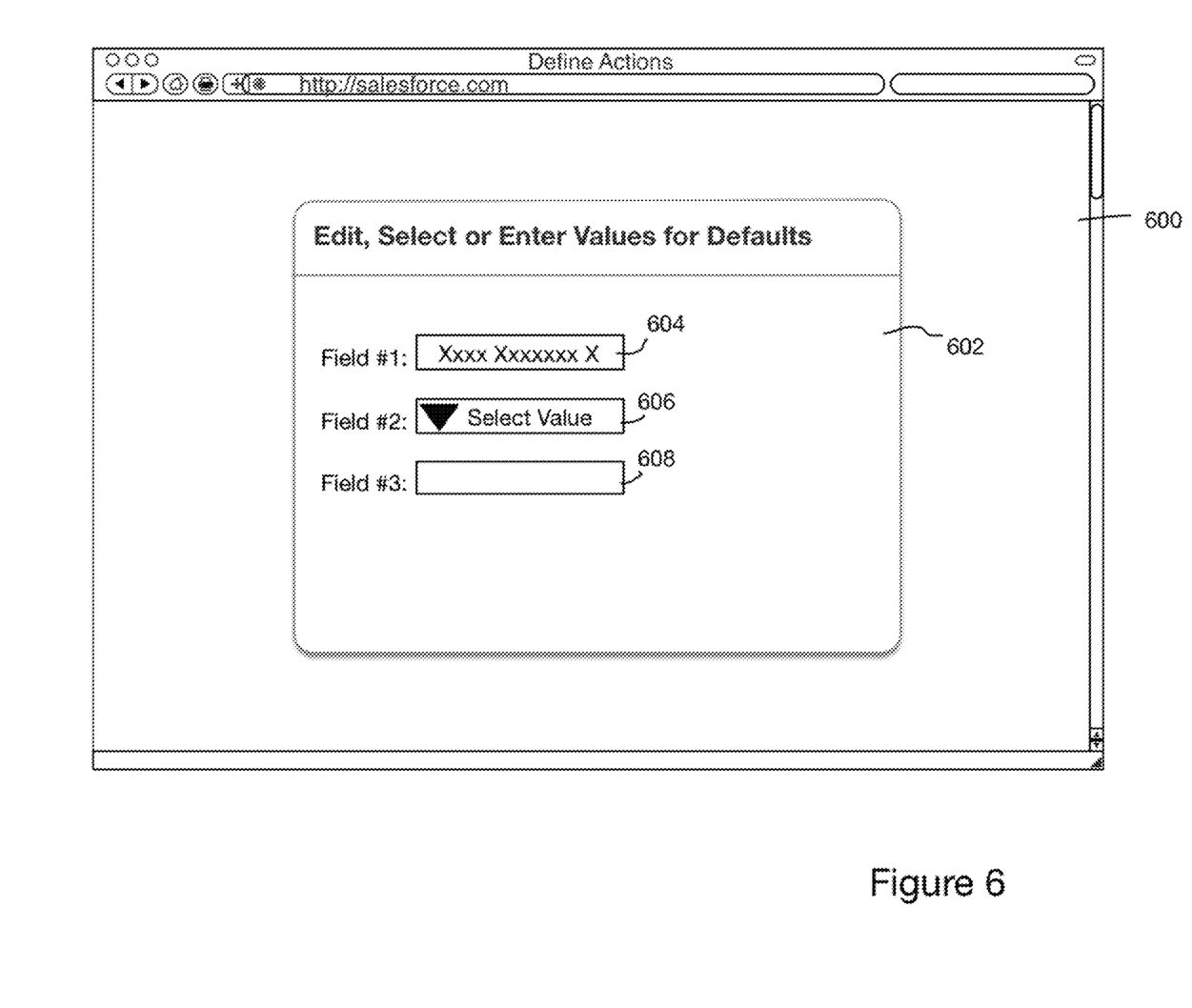
FIG. 6 depicts a widget to facilitate review, editing and selection of default values for plural records and/or communications in the embodiment shown in FIG. 1.

FIG. 6 depicts a graphical user interface 600 of the type generated by application 31 for display by browser 44 of a widget 602 to facilitate user review, editing and/or selection among multi-default values for fields of data records to be created/updated and/or communications to be posted in connection with performance of a mass action. Values for three such fields are shown here, labeled Field #1-Field #3, in widgets 604-608, respectively. The first of those 604 is an example of a widget in which a default value for the corresponding field (Field #1) has been populated for review and possible editing by the user of browser 44. The second 606 is an example of a widget in which the user is afforded an opportunity to select among multiple default values (not shown). The third 608 is an example of a widget for a field for which no default value was generated and for which the user is afforded an opportunity to enter a value ab initio. The foregoing are by way of example; other embodiments may vary in the number and form of widgets.

In step 122, the application 31 populates, with the default values received from the widget (possibly, with user edits and selections), fields of the plural data records being created/updated and/or of the plural communications being posted in connection with performance of the selected action. This can be accomplished, e.g., by invoking file system, database manager, and/or communications API's, or otherwise, in the conventional manner known in the art, as adapted in accord with the teachings hereof.

In step 124, the application 31 generates a success/error widget to display via browser 44 the success of the mass operation or, alternatively, to list errors that occurred in connection therewith. These can be, for example, errors returned by the aforesaid APIs during the creation/updating of data records and/or during posting of communications, or otherwise. A success/error widget with such a list can include, along with a description of each error, a hypertext or active link to the data record and/or communication in connection with which the respective error occurred enabling the user of browser 44 to readily jump to or otherwise view those records/communications. Such a widget, particularly, one that lists errors can be generated by application 31 to persist on the browser 44, even as other frames and windows change, until dismissed by the user.

Those skilled in the art will appreciate that the embodiments shown in the drawings and discussed above are merely illustrative and that other embodiments are contemplated, as well. For example, although the illustrated embodiment are adapted for use of the apparatus and methods described herein with web applications, other embodiments within the scope may provide for use of those apparatus and methods with other software applications.

In view of the foregoing, what we claim is:

1. A method of digital data processing comprising performing, with a data set management application during runtime operation on a digital data processing system, steps of:
    a first receiving step including receiving a definition of an action capable of being performed on one or more data records;
    a second receiving step including receiving a selection of multiple data records of a data set and an indication that the action is to be performed on the multiple selected data records;
    determining default values for one or more data fields of a plurality of data records to be created or updated during performance of the action with respect to the multiple selected data records by:
        determining effective values for a same one of the one or more data fields for each data record of the plurality of data records, wherein the effective value determined for a data record comprises a value stored in the one of the one or more data fields or a predefined value for the one of the one or more data fields if the one of the one or more data fields is empty in the data record, and
        if the effective values are the same for all of the plurality of data records, setting a default value for the one of the one or more data fields to be the effective value, or if the effective values are not the same for all of the plurality of data records, setting the default value to be a null value; and
    populating one or more data fields of the plurality of data records with one or more of those default values while creating or updating those data records during performance of the action with respect to the multiple selected data records, and storing the plurality of data records to the data set.

2. The method of claim 1, the first receiving step comprising performing, with the data set management application during runtime operation on the digital data processing system, a step of receiving a definition of one or more tasks to be executed in connection with the action and any of one or more data records and data fields in connection with which those one or more tasks are to be executed.

3. The method of claim 2, the first receiving step comprising performing, with the data set management application during runtime operation on the digital data processing system, a step of generating a manipulable graphical display of the definition.

4. The method of claim 1, the populating step comprising performing, with the data set management application during runtime operation on the digital data processing system, steps of displaying the default values and accepting edits with respect to one or more of the default values.

5. The method of claim 4, the populating step comprising performing, with the data set management application during runtime operation on the digital data processing system, a step of populating one or more data fields of the plurality of data records with one or more edited ones of the default values while creating or updating those data records during performance of the action.

6. The method of claim 4, the populating step comprising performing, with the data set management application during runtime operation on the digital data processing system, any of the displaying and edit-accepting steps with a manipulable graphical display.

7. The method of claim 1, the determining step comprising performing, with the data set management application during runtime operation on the digital data processing system, a step of determining the default values as a function of one or more of (i) a formulaic definition of a respective data field, (ii) pre-existing values one or more data fields of the multiple selected records, (iii) a context of those preexisting values.

8. The method of claim 7, the determining step comprising performing, with the data set management application during runtime operation on the digital data processing system, a step of determining the default values for one or more data fields of a plurality of records, at least one of which has a different data structure as defined by a constituency of data fields than at least one other of that plurality of data records.

9. The method of claim 7, the determining step comprising performing, with the data set management application during runtime operation on the digital data processing system, a step of determining multiple default values for at least one data field of at least one of the plural data records.

10. The method of claim 1, the populating step comprising performing, with the data set management application during runtime operation on the digital data processing system, a step of generating a manipulable graphical display to display the default values.

11. The method of claim 1, the populating step comprising performing, with the data set management application during runtime operation on the digital data processing system, a step of creating the plurality of data records and populating one or more data fields therein.

12. The method of claim 1, the populating step comprising performing, with the data set management application during runtime operation on the digital data processing system, a step of retrieving the multiple selected data records from the data set and populating one or more data fields therein.

13. The method of claim 1, the second receiving step comprising performing, with the data set management application during runtime operation on the digital data processing system, steps of generating a listing of records in the data set on a manipulable graphical display and receiving the selection of multiple data records via that manipulable graphical display.

14. The method of claim 1, the second receiving step comprising performing, with the data set management application during runtime operation on the digital data processing system, steps of displaying an identification of the action on the manipulable graphical display and receiving, via that manipulable graphical display, the indication that action is to be performed on the multiple selected data records.

15. The method of claim 1, including performing, with the data set management application during runtime operation on the digital data processing system, a step of generating a listing of one or more errors, if any, that occurred during performance of the action with respect to the multiple selected data records.

16. The method of claim 15, the generating step including performing, with the data set management application during runtime operation on the digital data processing system, a step of generating the listing of one or more errors on a manipulable graphical display along with at least one of (i) a description of an error that occurred with respect to a data record, and (ii) an interactive link to a data record with respect to which an error occurred.

17. The method of claim 15, the generating step including performing, with the data set management application during runtime operation on the digital data processing system, the step of generating the listing of one or more errors on the manipulable graphical display persistently.

18. Computer instructions configured to cause a digital data processing system to perform, with a data set management application during runtime operation on the digital data processing system, steps of:
a first receiving step including receiving a definition of an action capable of being performed on one or more data records;
a second receiving step including receiving a selection of multiple data records of a data set and an indication that the action is to be performed on the multiple selected data records;
determining default values for one or more data fields of a plurality of data records to be created or updated during performance of the action with respect to the multiple selected data records by:
determining effective values for a same one of the one or more data fields for each data record of the plurality of data records, wherein the effective value determined for a data record comprises a value stored in the one of the one or more data fields or a predefined value for the one of the one or more data fields if the one of the one or more data fields is empty in the data record, and
if the effective values are the same for all of the plurality of data records, setting a default value for the one of the one or more data fields to be the effective value, or if the effective values are not the same for all of the plurality of data records, setting the default value to be a null value;
populating one or more data fields of the plurality of data records with one or more of those default values while creating or updating those data records during performance of the action with respect to the multiple selected data records; and
storing the plurality of data records to the data set.

19. A machine readable storage medium having stored thereon a computer program configured to cause a digital data processing system to perform, with a data set management application during runtime operation on the digital data processing system, steps of:
a first receiving step including receiving a definition of an action capable of being performed on one or more data records;
a second receiving step including receiving a selection of multiple data records of a data set and an indication that the action is to be performed on the multiple selected data records;
determining default values for one or more data fields of a plurality of data records to be created or updated during performance of the action with respect to the multiple selected data records by:
determining effective values for a same one of the one or more data fields for each data record of the plurality of data records, wherein the effective value determined for a data record comprises a value stored in the one of the one or more data fields or a predefined value for the one of the one or more data fields if the one of the one or more data fields is empty in the data record, and
if the effective values are the same for all of the plurality of data records, setting a default value for the one of the one or more data fields to be the effective value, or if the effective values are not the same for all of the plurality of data records, setting the default value to be a null value; and
populating one or more data fields of the plurality of data records with one or more of those default values while creating or updating those data records during performance of the action with respect to the multiple selected data records, and storing the plurality of data records to the data set.

20. A method of digital data processing comprising performing, with a data set management application during runtime operation on a digital data processing system, steps of:
a first receiving step including receiving a definition of an action capable of being performed with respect to one or more data records;

a second receiving step including receiving a selection of multiple data records of a data set and an indication that the action is to be performed with respect the multiple selected data records;

determining default values for one or more fields of a plurality of communications to be posted during performance of the action with respect to the multiple selected data records by:

determining effective values for a same one of the one or more data fields for each data record of the multiple selected data records, wherein the effective value determined for a data record comprises a value stored in the one of the one or more data fields or a predefined value for the one of the one or more data fields if the one of the one or more data fields is empty in the data record, and if the effective values are the same for all of the multiple selected data records, setting a default value for the one of the one or more data fields to be the effective value, or if the effective values are not the same for all of the multiple selected data records, setting the default value to be a null value;

populating one or more fields of the plurality of communications in connection with performing the action with respect to the multiple selected data records; and posting the plurality of communications.

21. The method of claim 20, the communications including any of an email communication and a social network posting.

22. The method of claim 20, the first receiving step comprising performing, with the data set management application during runtime operation on the digital data processing system, a step of receiving a definition of one or more tasks to be executed in connection with the action and any of one or more communications to be posted and fields in connection with which those one or more tasks are to be executed.

23. The method of claim 20, the populating step comprising performing, with the data set management application during runtime operation on the digital data processing system, steps of displaying the default values and accepting edits with respect to one or more of the default values.

24. The method of claim 20, the determining step comprising performing, with the data set management application during runtime operation on the digital data processing system, a step of determining the default values as a function of one or more of (i) a formulaic definition of a respective field, (ii) pre-existing values one or more fields of the multiple selected records, (iii) a context of those pre-existing values.

25. The method of claim 20, the populating step comprising performing, with the data set management application during runtime operation on the digital data processing system, a step of generating a manipulable graphical display to display the default values.

26. Computer instructions configured to cause a digital data processing system to perform, with a data set management application during runtime operation on the digital data processing system, steps of:

a first receiving step including receiving a definition of an action capable of being performed with respect to one or more data records;

a second receiving step including receiving a selection of multiple data records of a data set and an indication that the action is to be performed with respect the multiple selected data records;

determining default values for one or more fields of a plurality of communications to be posted during performance of the action with respect to the multiple selected data records by:

determining effective values for a same one of the one or more data fields for each data record of the multiple selected data records, wherein the effective value determined for a data record comprises a value stored in the one of the one or more data fields or a predefined value for the one of the one or more data fields if the one of the one or more data fields is empty in the data record, and if the effective values are the same for all of the multiple selected data records, setting a default value for the one of the one or more data fields to be the effective value, or if the effective values are not the same for all of the multiple selected data records, setting the default value to be a null value;

populating one or more fields of the plurality of communications in connection with performing the action with respect to the multiple selected data records; and posting the plurality of communications.

27. A machine readable storage medium having stored thereon a computer program configured to cause a digital data processing system to perform, with a data set management application during runtime operation on the digital data processing system, steps of:

a first receiving step including receiving a definition of an action capable of being performed with respect to one or more data records, a second receiving step including receiving a selection of multiple data records of a data set and an indication that the action is to be performed with respect the multiple selected data records, determining default values for one or more fields of a plurality of communications to be posted during performance of the action with respect to the multiple selected data records by:

determining effective values for a same one of the one or more data fields for each data record of the plurality of data records, wherein the effective value determined for a data record comprises a value stored in the one of the one or more data fields or a predefined value for the one of the one or more data fields if the one of the one or more data fields is empty in the data record, and if the effective values are the same for all of the plurality of data records, setting a default value for the one of the one or more data fields to be the effective value, or if the effective values are not the same for all of the plurality of data records, setting the default value to be a null value;

populating one or more fields of the plurality of communications in connection with performing the action with respect to the multiple selected data records, and posting the plurality of communications.

* * * * *